June 30, 1953  L. H. SMITH  2,643,711
SCREEN FOR VEHICLES
Filed Oct. 9, 1950  2 Sheets-Sheet 1
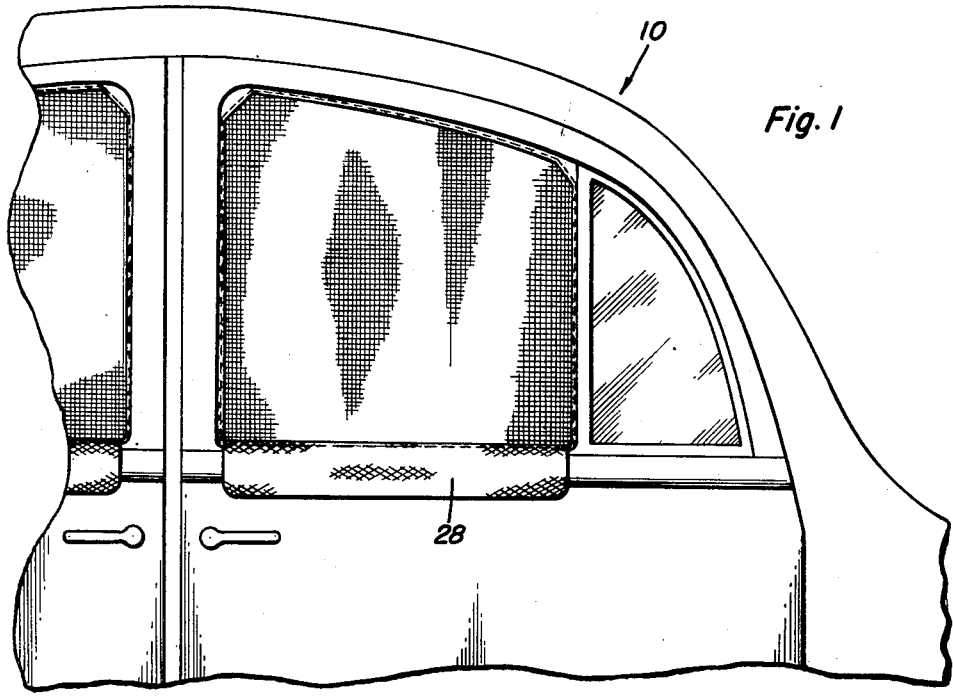
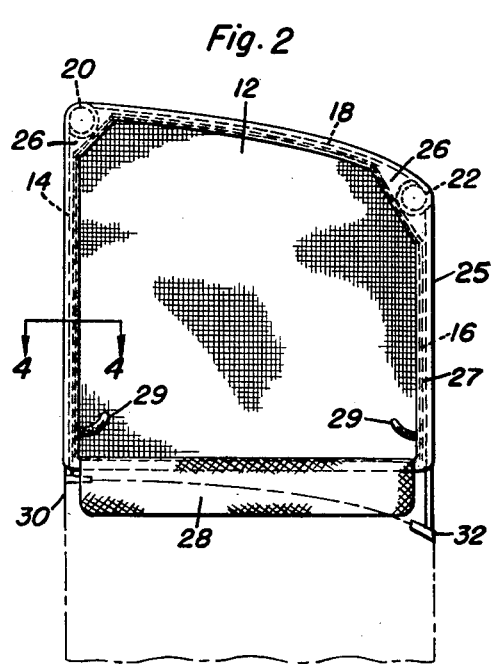
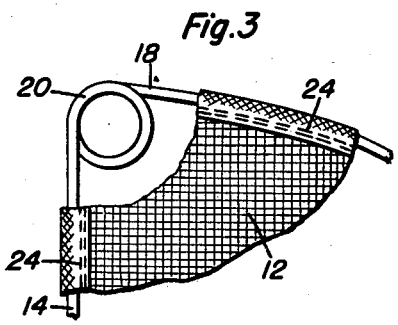
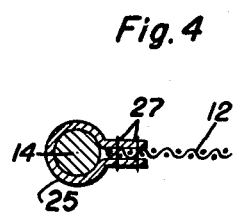
Lucy H. Smith
INVENTOR.

June 30, 1953  L. H. SMITH  2,643,711
SCREEN FOR VEHICLES
Filed Oct. 9, 1950  2 Sheets-Sheet 2
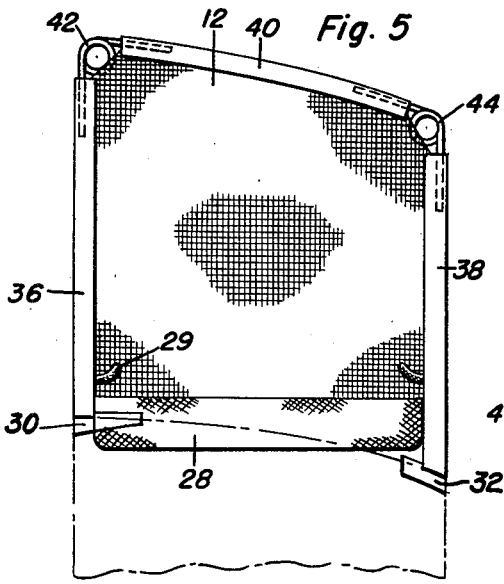
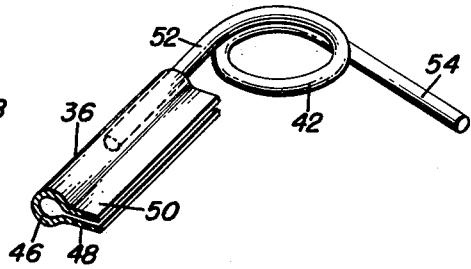
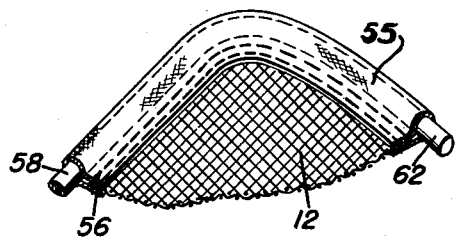
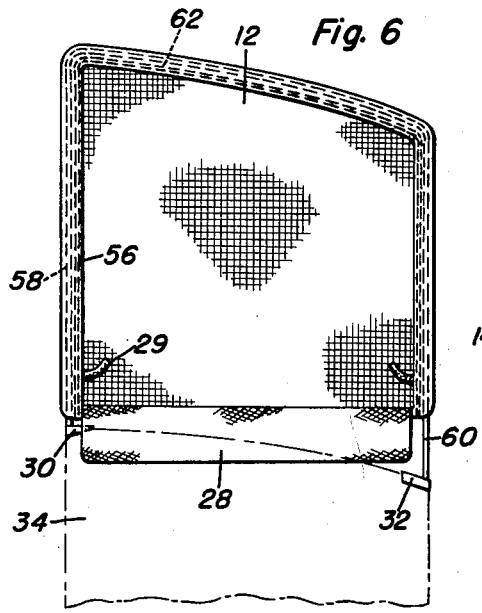
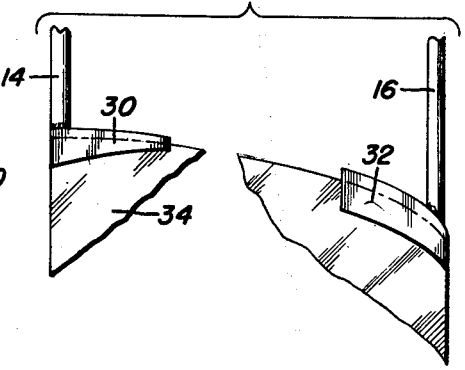
Lucy H. Smith
INVENTOR.

Patented June 30, 1953

2,643,711

UNITED STATES PATENT OFFICE 2,643,711

SCREEN FOR VEHICLES

Lucy H. Smith, Naval Base, S. C.

Application October 9, 1950, Serial No. 189,186

2 Claims. (Cl. 160—105)

This invention comprises novel and useful improvements in a screen for vehicles and more specifically pertains to a flexible or pliable screen specifically adapted to be removably and conveniently mounted in the window openings of vehicles for closing these openings against the ingress of flies or other pests while affording ventilation for the interior of the vehicle.

The primary object of this invention is to provide an inexpensive, light-weight screen capable of ready application to or removal from conventional window openings of vehicles.

A further object of the invention is to provide a window screen for vehicles capable of being fabricated from a relatively non-rigid, light weight reticulated sheet of pliable and flexible material and yet which may be readily and securely mounted in the window channel members of conventional vehicles.

A still further object of the invention is to provide a window screen in conformity with the preceding objects and which shall have a relatively rigid and sturdy frame secured to the pliable material for supporting the same, which frame shall be yieldingly expansible and adapted for convenient and secure seating engagement in the conventional channel members forming the widow frames of vehicles.

A still further object of the invention is to provide a window frame as set forth in the foregoing objects which shall be provided with means whereby the frame may be securely supported upon the upper edge of a conventional window glass and which shall thereby prevent closing of the glass when the screen is in place.

Yet another important object of the invention is to provide an improved window screen in accordance with the above mentioned objects in which resiliency shall be imparted to the supporting frame of the screen for yieldingly urging the same into seated position in the channel members of a vehicle window.

And a final important object of the invention to be specifically enumerated herein is to provide a window screen in accordance with the preceding objects which shall be provided with an apron to effectively close the window glass opening of a window frame of vehicles together with lifting tabs for applying or removing the screen from the window opening.

These, together with various ancillary features and objects of the invention which will later become apparent as the following description proceeds, are attained by the present invention, preferred embodiments of which have been illustrated, by way of example only, in the accompaying drawings, wherein:

Figure 1 is a fragmentary side elevational view of a portion of an automotive vehicle and the window opening of the same showing a window screen which incorporates therein the principles of this invention, applied to the window opening;

Figure 2 is a side elevational view of a portion of Figure 1, taken from the interior of the vehicle and showing the window screen in its applied or its installed position in the window opening;

Figure 3 is a fragmentary detail view, upon an enlarged scale, parts being broken away, showing one embodiment of resilient means forming a part of the screen frame of the window screen;

Figure 4 is a horizontal sectional detail view taken substantially upon the plane indicated by the section line 4—4 of Figure 2 and showing one manner in which the reticulated window screen is secured to its supporting frame;

Figure 5 is a view similar to Figure 2 but showing a still further and modified construction of the resilient means forming a part of the window screen frame;

Figure 6 is a view similiar to Figure 2 but showing a still further modified construction of screen frame in accordance with this invention;

Figure 7 is a detail view of a part of Figure 5, showing the arrangement for imparting resiliency to the supporting frame of the window screen;

Figure 8 is a fragmentary detail view of Figure 6 showing the manner in which a window screen of a plastic reticulated material may be secured to its supporting screen frame; and Figure 9 is a fragmentary detail view, parts being broken away, of a pair of supporting shoes which may be employed with any of the window screens shown herein.

Referring now more specifically to the accompanying drawings, wherein like numerals designate similar parts throughout the various views, it will be seen that the numeral 10 designates generally a portion of any conventional form of vehicle, the doors or sides of which are provided with the customary window openings or frames. As will be understood, the conventional window frame of vehicles usually comprises a pair of vertical and a top channel member which slidably receive the sides and top of a window glass as the latter is moved to its upper or closed position, while the frame further includes a horizontal glass opening, permitting the elevation or lowering of the window glass into the body of the vehicle when the window is open. Since this construction in itself is of conventional and well known form, further illustration and description of the same is deemed to be unnecessary.

In accordance with this invention, the novel window screen adapted to be inserted in the window frame of a vehicle when the window glass is in its lowered position, consists of a body 12 which may conveniently comprise a flexible, pliable sheet of reticulated material such as a plastic material screen, wire screen, and the like. In order to impart sufficient rigidity to the lightweight sheet material of the body 12 and thereby retain the same in the window opening of a vehicle, a screen supporting frame is necessary. In each of the embodiments of screen disclosed herein, this supporting frame, which may be of any desired material, includes a pair of side members connected by a top member. The screen frame is thus generally U-shaped in its configuration, and these three members of the same are adapted to respectively seat in and be resiliently retained, as set forth hereinafter, in the channel members forming the sides and top of the window opening of the vehicle.

Referring first to the construction of window screen disclosed in Figures 2–4, it will be seen that the frame of this screen preferably comprises a single piece of wire having the vertical side members 14 and 16, integrally connected to the opposite ends of the top member 18 as by a pair of helical coil portions 20 and 22. Obviously, the spring coils 20 and 22 yieldingly urge the side members 14 and 16 outwardly from and pivotally about the ends of the top member 18 to thereby cause the side members to yieldingly be pressed into seated engagement in the channel members of the window frame. It will, of course, be understood that in all of the window screens, in accordance with this invention, a proper contour will be given to the body 12 and to the screen frame of the same in order to enable the window screen to be snugly seated in the channel members forming a part of the vehicle window opening. The top and side edges of the body 12, when constructed of a sheet of plastic screening material, will preferably be folded about the frame members as shown in Figure 3, and be secured thereto, as by rows of stitching 24. At the two upper corners of the screen, it is preferred to privide triangular corner coverings 26 which may be cloth or leather, as desired, to enclose the springs. When the screen is of other material a binder 25 is employed to secure the same to the frame members as by stitching 27, as shown in Figures 2 and 4.

Preferably adjacent the lower portions of the frame side members, there are secured a pair of lifting tabs 29 of cloth or any other desired material which may be grasped to squeeze the two sides of the resilient frame of the screen towards each other in order to facilitate the application of the screen to the window opening of a motor vehicle or its removal therefrom.

At its lower edge, the body 12 has secured thereto, as by sewing or in any other desired manner, a depending apron 28 which is adapted to be disposed outwardly of the vehicle body and thus overlie and cover the opening in the vehicle which receives the window glass when the latter is raised.

At their lower ends, the side members 14 and 16 of the frame of the screen are provided with depending shoes 30 and 32, see Figure 9. These shoes are preferably channel-shaped and are adapted to rest upon the upper edge of the window glass 34 and to embrace the opposite sides of the same, the lower edges of these shoes being properly contoured to correspond to the curvature of the upper edge of the window glass. These shoes are adapted to rest upon the upper edge of the window glass and serve both to support and hold the window screen in its uppermost position with the top edge of the same seated in the top channel member of the window frame opening of the vehicle, and also prevent raising of the window glass when the screen is installed in the window opening.

It should be here noted that the apron, the lifting tabs and the shoes are of substantially identical construction throughout all of the various modifications of screen construction disclosed herein.

Reference is now made to the modified construction disclosed in Figures 5 and 7. In this form, the window screen includes the body 12, which may be of either metallic screening or plastic screening, as desired, the construction shown in Figures 5 and 7 being particularly suitable for use with metallic wire screening. In this arrangement, as in the preceding form, the pliable sheet of screening 12 is secured to a substantially rigid screen frame consisting of side members 36 and 38 which are connected to a top member 40 by a pair of resilient means 42 and 44 secured to the opposite ends of the top member. As shown more clearly in Figure 7, each of the members 36, 38 and 40 preferably comprises a sheet metal or plastic channel shaped member having a cylindrical bead or sleeve 46 from which extends parallel side flanges 48 and 50. These flanges are adapted to frictionally clamp upon and embrace the edges of the screen sheet 12 for secure engagement with the latter, while the cylindrical portions 46 are adapted to frictionally embrace and be clamped upon the opposite leg portions 52 and 54 of the coil spring members 42 and 44. It will thus be seen that the frame members are resiliently and yieldingly secured to each other whereby the side members are resiliently urged outwardly with respect to the top member for the same purpose set forth in connection with the frame of the preceding embodiment.

In the embodiment of Figures 5 and 7, the above mentioned corner pockets or covers 26 may be omitted, as shown, although in some instances these covers may be employed in the manner disclosed in Figure 2.

Referring now to Figures 6 and 8, there is disclosed a still further construction of resilient frame for the screen. In this embodiment, the body 12, of either metallic or plastic composition, has its sides and top edges terminating adjacent a U-shaped wire or rod constituting a screen frame. A binder 55 embraces the U-shaped wire and the top and side edges of the body 12 and is sewed to the body as at 56. The U-shaped frame includes side members 58 and 60 which are integrally connected at their upper ends to the opposite extremities of the top member 62. The operation of this form of the invention is identical with that previously described.

Since, from the foregoing, the construction and advantages of this invention are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A screen for vehicle windows comprising a body of pliable reticulated material, a frame secured to said body for mounting the same, said frame having side and top members adapted to seat in the channel members of a vehicle window, spaced shoes respectively on said side members for embracingly engaging the upper edge of a window glass, and resilient means connecting said top to said side members for yieldingly urging said members against said window channel members.

2. A screen for vehicle windows comprising a body of pliable reticulated material, a frame secured to said body for mounting the same, said frame having side and top members adapted to seat in the channel members of a vehicle window, spaced shoes respectively on said side members for embracingly engaging the upper edge of a window glass, and resilient means connecting said top to said side members for yieldingly urging said members against said window channel members, said top and side members comprising metallic channel members, said resilient means comprising coil springs having their ends embraced in adjacent ends of said metallic channel members.

LUCY H. SMITH.

References Cited in the file of this patent

UNITED STATES PATENTS

| Number | Name | Date |
|---|---|---|
| 1,605,200 | Bacon | Nov. 2, 1926 |
| 1,619,501 | Evans | Mar. 1, 1927 |
| 1,687,874 | McNally | Oct. 16, 1928 |
| 1,702,395 | Anderson | Feb. 19, 1929 |
| 2,568,800 | Galla | Sept. 25, 1951 |